Patented Feb. 1, 1938

2,107,133

UNITED STATES PATENT OFFICE 2,107,133

PREPARATION OF SOY SAUCE

Walter O. Snelling, Allentown, Pa.

No Drawing. Application January 12, 1937,
Serial No. 120,290

9 Claims. (Cl. 99—145)

My invention relates to improvements in the preparation of flavoring materials of the general nature of soy sauce, and more particularly relates to improved methods by which the time necessary for the preparation of soy sauce may be materially reduced. The principal objects of my invention are to improve the quality and reduce the cost of the preparation of flavoring agents from proteins, by providing means by which the process of brewing or preparation may be speeded up, with consequent reduction of the time required for manufacture.

The process of making soy sauce, as practiced for centuries in the Orient, is a very slow operation. Although a relatively poor quality of soy sauce can be prepared in six months or a year, soy sauce of the highest quality requires a period of manufacture of from two to five years, the quality and flavor of the material increasing slowly with time.

Although the chemical reactions involved in the preparation of soy sauce are unknown, it is well recognized that enzymes produced by the growth of the koji mold Aspergilli oryzae act upon the protein of the soy bean or other such protein raw material as may be used, to produce a large number of chemical products which together produce the flavor so greatly desired in soy sauce.

I have discovered that by rapidly hydrolyzing proteins by a strong inorganic hydrolyzing agent, such as a caustic alkali, or a mineral acid such as hydrochloric acid, sulphuric acid or phosphoric acid for example, until the proteins are partially but not completely broken down into the products of hydrolysis, then correcting the pH value, as by reducing the acidity of acid mixtures by the addition of any suitable neutralizing agent, and thereafter culturing the mixture with a suitable strain of the yellow-green Aspergilli or koji mold, I am able to reduce the time of preparation of soy sauce to a few months and under favorable conditions even to a few weeks, with the production of a product of equal or superior flavor.

My invention rests upon my discovery that the enzymes of the koji mold, such as the yellow-green Aspergilli, A. flavus-oryzae for example, act very slowly and inefficiently in the preliminary breaking down of the protein molecule, so that months are required to produce a suitable substrate for the final steps which produce the real flavoring materials. By the use of strong hydrolyzing agents I produce, in a few hours, hydrolytic products of the protein which represent a highly satisfactory culture medium for the mold, and which it rapidly and efficiently transforms into the final flavoring materials of the finished soy sauce.

In the practice of my invention, I prefer to start with soy beans, soy meal or soy oil cake from which a part or all of the oil has been removed by either pressing or extraction, but I may use the whole bean as my raw material, and I may also employ other proteins, such as corn protein, peanut protein or cottonseed protein for example, either alone or preferably in admixture with soy protein. The protein is admixed with a small amount of water and from 5% to 50% of a strong hydrolyzing agent, preferably hydrochloric acid, and heated to preferably the boiling point of water until approximately half of the protein has been fully degraded, by the usual processes of hydrolysis. In order to determine the time required in this step, I prefer to make a preliminary hydrolysis with the particular protein mixture that is employed in the main operation, and to hydrolyze this pilot lot until the biuret reaction shows that hydrolysis is complete. This may require from two to forty hours, using the customary hydrolyzing mixtures, the time depending upon the concentration that is employed. Having determined by this preliminary experiment the length of time required for complete hydrolysis, with the particular concentration of acid or alkali hydrolyzing agent used and the particular protein being treated, I then hydrolyze the main portion of my protein with the same concentration of hydrolyzing agent and at the same temperature, as determined in the pilot experiment, for from one-fourth to three-fourths of the time in hours required for complete hydrolysis.

I next neutralize the excess acid (or excess alkali, if an alkaline hydrolyzing agent was employed) to bring the pH value of my mixture to the range within which the koji mold lives best. In the preferred embodiment of my invention I use hydrochloric acid as my hydrolyzing agent, and I prefer to neutralize with either sodium hydroxide or sodium carbonate. When sulphuric acid is used, it is of course desirable to neutralize with barium or strontium oxides, hydroxides or carbonates, and particularly when using barium as a neutralizing agent, it is very important to see that all traces of the barium are removed from the finished product by a slight excess of sulphate, in view of the poisonous nature of soluble barium compounds. In view of the eminently satisfactory action of hydrochloric acid as a hydrolyzing agent, I prefer to use this material, but I have obtained satisfactory results from the use of alkaline hydrolyzing agents and from the use of other mineral acids than hydrochloric acid, both singly and in admixture.

By the process described, I obtain in a few hours a hydrolysate of the original protein employed, and I next admix this hydrolysate with a parched or roasted product, preferably parched wheat, barley, rye, chicory or equivalent cereal product, in exactly the same manner as is ordinarily employed in the preparation of soy sauce by the method long employed in the Orient, and preferably using from twenty to forty parts of roasted cereal to each one hundred parts of protein started with. As my process of treatment after the rapid preliminary partial decomposition of the proteins does not differ in any way from the ordinary process of brewing soy sauce as described very fully in the article "Japanische Sojaindustrie" Gen-Itsu Kita, Wochenscrift fur Brauerei 30, No. 42, October 18th, 1913, pages 549-552 and No. 43, October 25th, 1913, pages 559-561, I will not here enter into the details of the process. The process consists essentially of inoculating the salted mixture of protein material and parched or roasted cereal product with koji mold, particularly the strain described by Thom and Church, in their book "The Aspergilli", as the yellow-green Aspergilli, A. flavus-oryzae, and occasionally stirring and aerating the mixture during the preliminary period of action of the A. flavus-oryzae. Inert supporting structures or other means may be used if desired to facilitate aeration of the mixture, and thus to compensate for its relatively fluid nature, particularly during the koji step.

In one modification of my invention I first hydrolyze soy bean or other protein with an inorganic hydrolyzing agent as already described, carrying the hydrolysis relatively far toward completion. I then complete the breaking down of the protein preferably by adding both a culture of the yellow-green Aspergilli A. flavus-oryzae and a strong solution of the enzymes produced by the growth of the A. flavus-oryzae. The enzymes thus introduced exert a strong enzymic action on the protein decomposition products produced in the preliminary hydrolysis, even in the complete absence of the living mold itself, and bring about the very rapid production of the final amino acids and other protein decomposition products that produce in large part the preferred flavor that is desired in the finished soy sauce. By employing both a culture of A. flavus-oryzae and a strong solution of the enzymes produced by A. flavus-oryzae I am able to obtain the joint effect of the two agencies, and maximum enzymic activity in the final steps of the preparation of the soy sauce.

My invention relates primarily to the process which comprises first subjecting proteins to a preliminary partial hydrolysis by the use of an inorganic hydrolyzing agent in the absence of molds or other organic enzymic agents until the proteins have been partially but incompletely hydrolyzed or degraded, then partially or completely neutralizing the inorganic hydrolyzing agent, adding parched cereal products, additional salt and other products if desired, inoculating the mixture with a koji ferment or culture, particularly the yellow-green A. flavus-oryzae, and thereafter proceeding by the brewing or treating operations customary in the oriental preparation of soy sauce. My invention owes its efficacy mainly to my discovery that the koji ferment or culture and associated micro-organisms grow better and more rapidly upon the hydrolytic products of proteins produced by the action of inorganic hydrolyzing agents than they do upon the raw proteins themselves, and that accordingly months of time can be saved in the preparation of soy sauce by the preliminary treatment of protein at high temperatures with a vigorous inorganic hydrolyzing agent until the protein has been partially but not completely hydrolyzed, subjecting the product thus made to a suitable neutralizing treatment to modify its pH value to a range suitable for the life of the koji mold, then inoculating with a suitable strain of the yellow-green A. flavus-oryzae, and thereafter permitting the normal enzymic processes employed in the preparation of soy sauce to go on to completion, as in the customary preparation of soy souce.

It will be evident that many modifications may be made within the scope of my invention, without departing from the limits of the disclosure as herein made, and accordingly no limitations should be placed upon my invention except as are indicated in the appended claims.

I claim:

1. In the preparation of soy souce, the process which comprises partially but not completely hydrolyzing a protein by an inorganic hydrolyzing agent in the absence of organic enzymes, neutralizing the resulting reaction product if desirable and thereafter completing the hydrolysis by the action of enzymes produced by the yellow-green Aspergilli A. flavus-oryzae.

2. In the preparation of soy sauce, the process which comprises partially but not completely hydrolyzing a protein by an inorganic acid in the absence of organic enzymes, neutralizing the resulting reaction product if desirable and thereafter completing the hydrolysis by the action of enzymes produced by the yellow-green Aspergilli A. flavus-oryzae.

3. In the preparation of soy sauce, the process which comprises partially but not completely hydrolyzing a protein by an inorganic hydrolyzing agent in the absence of organic enzymes, adding a neutralizing agent to the partially hydrolyzed protein mixture, and thereafter completing the hydrolysis by the action of enzymes produced by the yellow-green Aspergilli A. flavus-oryzae.

4. In the preparation of soy sauce, the process which comprises partially but not completely hydrolyzing a protein by an inorganic acid in the absence of organic enzymes, adding a neutralizing agent to the partially hydrolyzed protein mixture, and thereafter completing the hydrolysis by the action of enzymes produced by the yellow-green Aspergilli A. flavus-oryzae.

5. In the preparation of soy sauce, the process which comprises partially but not completely hydrolyzing a protein by hydrochloric acid in the absence of organic enzymes, neutralizing the resulting reaction product if desirable and thereafter completing the hydrolysis by the action of enzymes produced by the yellow-green Aspergilli A. flavus-oryzae.

6. In the preparation of soy souce, the process which comprises partially but not completely hydrolyzing a protein by hydrochloric acid in the absence of organic enzymes, adding a neutralizing agent to the partially hydrolyzed protein mixture, and thereafter completing the hydrolysis by the action of enzymes produced by the yellow-green Aspergilli A. flavus-oryzae.

7. In the preparation of soy sauce, the process which comprises partially but not completely hydrolyzing a protein by hydrochloric acid in the absence of organic enzymes, adding a neutralizing agent selected from the group of sodium hydroxide, sodium carbonate or sodium bicarbonate to the partially hydrolyzed protein mixture, and thereafter completing the hydrolysis by the action of enzymes produced by the yellow-green Aspergilli *A. flavus-oryzae*.

8. In the preparation of soy sauce, the process which comprises partially but not completely hydrolyzing a protein by an inorganic hydrolyzing agent in the absence of organic enzymes, neutralizing the resulting reaction product if desirable and thereafter adding a culture of the yellow-green Aspergilli *A. flavus-oryzae* together with enzymes produced by that organism to complete the hydrolysis of the protein.

9. In the preparation of soy sauce, the process which comprises partially but not completely hydrolyzing soy bean protein by an inorganic hydrolyzing agent in the absence of koji mold, adding a neutralizing agent to the partialy hydrolyzed protein mixture, and then employing this partially hydrolyzed protein mixture as the raw material for the preparation of soy sauce by the customary method of treatment with the yellow-green Aspergilli *A. flavus-oryzae*.

WALTER O. SNELLING.